Oct. 15, 1968

G. E. PIHL 3,406,388

ELECTROMAGNETIC INDICATOR HAVING PERMANENT
MAGNET MOUNTED ON ROTATING SHAFT

Filed Sept. 28, 1965

INVENTOR.
GEORGE E. PIHL
BY
Nicholas A. Pandiscio
ATTORNEY

Oct. 15, 1968 G. E. PIHL 3,406,388
ELECTROMAGNETIC INDICATOR HAVING PERMANENT
MAGNET MOUNTED ON ROTATING SHAFT
Filed Sept. 28, 1965 2 Sheets-Sheet 2

INVENTOR.
GEORGE E. PIHL
BY
Nicholas A. Pandiscio
ATTORNEY

United States Patent Office 3,406,388
Patented Oct. 15, 1968

3,406,388
ELECTROMAGNETIC INDICATOR HAVING PERMANENT MAGNET MOUNTED ON ROTATING SHAFT
George E. Pihl, Abington, Mass., assignor to Miniature Electronic Components Corp., Holbrook, Mass., a corporation of Massachusetts
Filed Sept. 28, 1965, Ser. No. 490,905
8 Claims. (Cl. 340—373)

ABSTRACT OF THE DISCLOSURE

An electromagnetically operated indicator capable of binary indication. The device comprises a rotatable shaft carrying at one end a permanent bar magnet having salient poles, energizable electromagnetic means adapted to rotate the magnet in one direction, and additional electromagnetic means or rotatable mechanical means for rotating the magnet in the opposite direction. Each electromagnetic means includes a core which is magnetically permeable and also functions as a mechanical stop for the magnet. The binary indication is provided by indication means comprising a fixed window member having opaque and transparent portions and a member mounted for rotation with the magnet having indicia which is exposed or hidden by the window according to the position of the magnet.

---

This invention relates to indicators and more particularly to electromagnetic apparatus capable of indicating two different predetermined conditions.

The primary object of the present invention is to provide a new and improved miniature electromagnetic indicator capable of binary indication.

Another important object of this invention is to provide a new and improved electromagnetically operated indicator which is characterized by magnetic latching in each of its predetermined display positions.

Still another object is to provide a miniature indicator whose display is easily distinguishable even where ambient light conditions provide low contrast.

A further object of the invention is to provide a miniature electromagnetic indicator which is easy to assemble and repair, operates with low power input, and is adapted for use in installations subject to shock and vibration.

A more specific object of the invention is to provide an improved electromagnetic indicator of the type which embodies a rotatable indicator member and electromagnetic means for altering the display position of the indicator member.

Still another specific object of the invention is to provide an electromagnetic indicator capable of providing two distinct indications, one indication produced by energization of electromagnetic means and the other indication produced by mechanical means.

The foregoing and other objects are achieved by an indicator construction featuring a shaft with a permanent magnet attached to one end, means rotatably supporting the shaft, an electromagnetic assembly operative to rotate said shaft by magnetically influencing the magnet thereon, means for limiting rotation of the shaft between two predetermined positions, and means providing one indication in one of said shaft positions and a second indication in the other of said shaft positions. In one embodiment of the invention both shaft positions are achieved by energization of electromagnetic means. In a second embodiment of the invention the electromagnetic means advance the shaft from the first to the second of its predetermined positions and manually operable mechanical means rotate the shaft back to its first position.

Other objects and many of the attendant advantages of the present invention will be appreciated from the following detailed description which is to be considered together with the accompanying drawings wherein.

Figure 4:
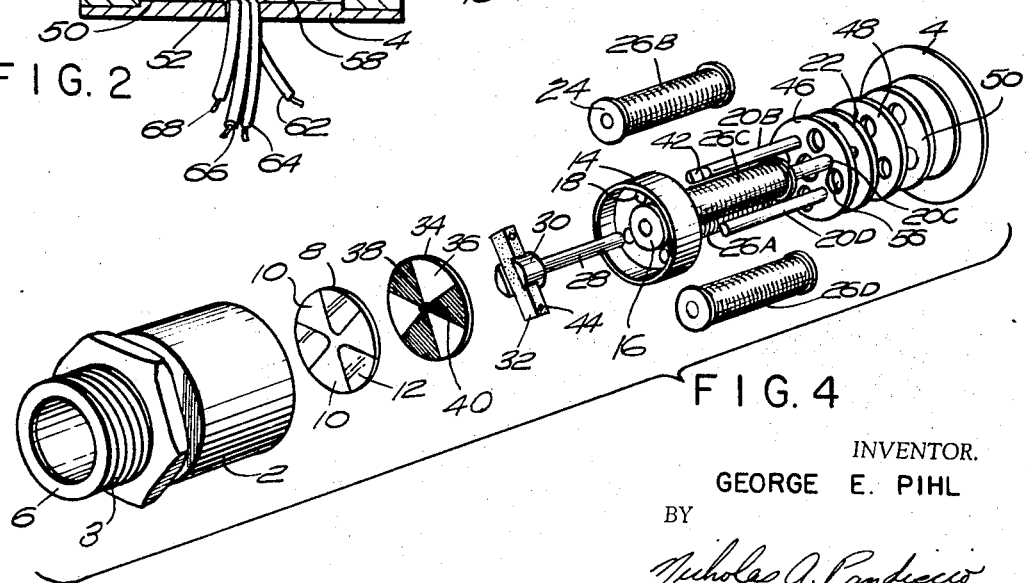
FIG. 4 is an exploded view of the same indicator.
Figure 6:
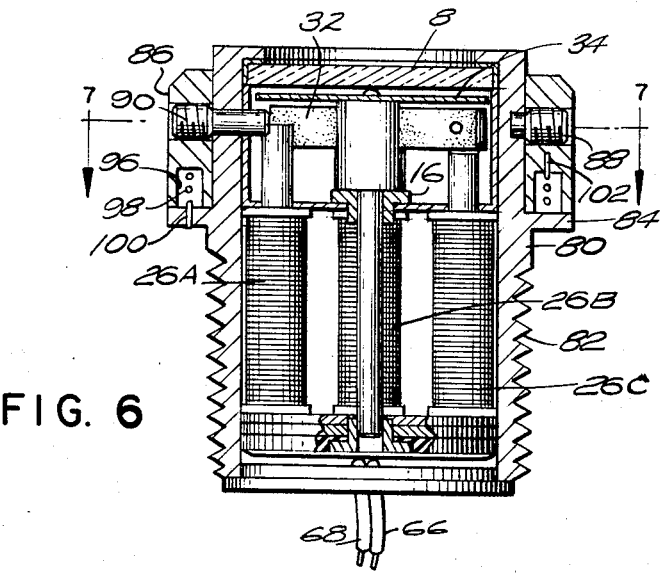
Figure 5:
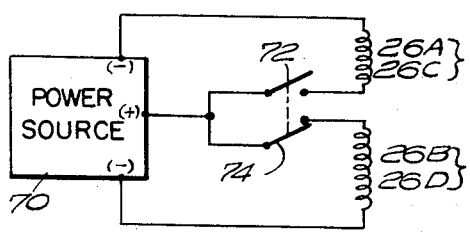

FIG. 5 schematically illustrates the operating circuit for the indicator of FIGS. 1–4;

FIG. 6 is a longitudinal sectional view of a second form of the invention; and

Figure 7:
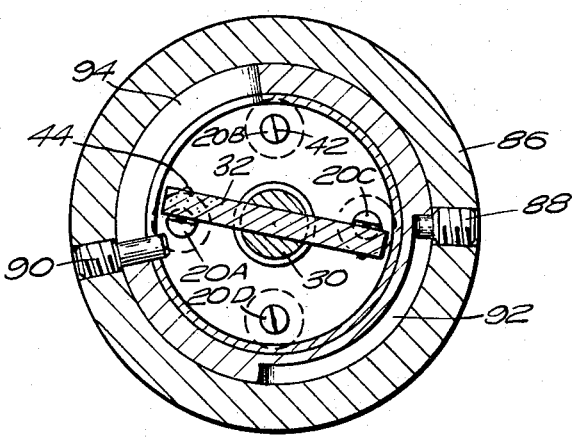

FIG. 7 is a sectional view taken along lines 7—7 of FIG. 6.

Figure 1:
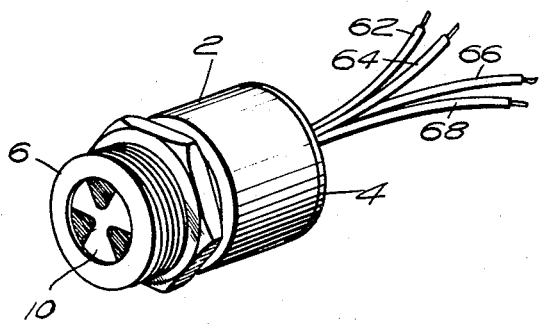
FIG. 1 is a perspective view of a preferred embodiment of a miniature electromagnetic indicator embodying the present invention.
Figure 2:
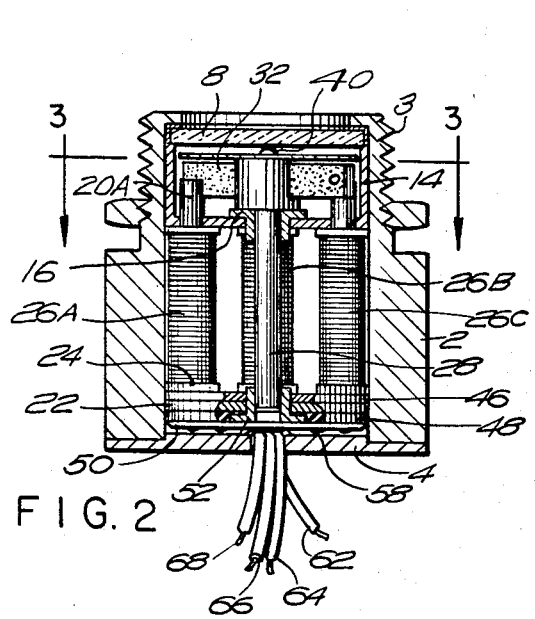
FIG. 2 is a longitudinal sectional view of the indicator of FIG. 1.
Figure 3:
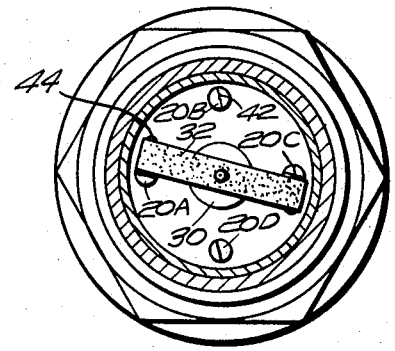
FIG. 3 is a sectional view taken along line 3—3 of FIG. 2.

Turning first to FIGS. 1–4, the preferred embodiment of the invention comprises a metal case 2 provided with an exterior thread 3 at its top end for securing it to a display panel. The case is formed with an open bottom end which, after assembly of the components hereinafter described, is closed off by a cover member 4. It also is formed with an open top end characterized by an inturned flange 6 which defines an aperture that is closed off by a window pane 8 formed of a transparent material, preferably glass, that is adapted to coact with another member (hereinafter described) to provide a visible display indicative of one of two conditions. As seen in FIGS. 1 and 4, the window pane 8 has three equally spaced sectors 10 that are coated with opaque white paint, leaving three equally spaced transparent sector shaped areas 12. The three white sectors are joined in the center. The pane 8 is cemented in place against the flange 6 and is engaged on its inner side by a cup 14 which forms part of an electromagnet assembly. The cup 14 is made of non-magnetic material and is provided with a central aperture in which is disposed a bearing member 16. The cup also has four equally spaced holes 18 to accommodate the upper ends of four identical soft iron cores 20A, 20B, 20C and 20D which are attached at their bottom ends to a soft iron disc 22.

The four soft iron cores 20 and the single soft iron disc 22 form part of four like electromagnets, each of which also comprise a hollow bobbin 24 and a coil of fine wire 26 wound about the bobbin. For convenience the four coils are identified as 26A, 26B, 26C and 26D. The four bobbins are mounted on the four cores 20, with their bottom ends engaging disc 22 and their top ends engaging the underside of cup 14. The upper ends of the cores protrude into the cup in the manner shown in FIG. 2.

The bearing 16 rotatably supports a shaft 28. The upper end of the shaft has an enlarged portion 30 having a centrally located slot in which is secured an elongate permanent magnet 32. Secured to the magnet is an opaque circular indicator disc 34 whose upper surface is divided equally into three white sectors 36 and three dark sectors 38. Disc 34 has a rounded protuberance 40 that engages the pane 8 and acts as a thrust bearing to prevent upward movement of shaft 28. Protuberance 40 preferably consists of a dob of epoxy resin.

The magnet 32 is located at the level of the upper ends of cores 20 and its opposite ends extend radially away from the shaft a distance at least equal to the minimum radial distance between cores 20 and the central axis of casing 2. In other words (as seen best in FIGS. 2 and 3) the upstanding ends of the cores limit rotation of the magnet and shaft 28 to an angle less than 90° terminating in two different positions, one position occurring when the magnet engages cores 20A and 20C and the other position occurring when the magnet engages cores 20B and 20D. The upper end of each core is cut away to form a diametric flat surface 42 so as to allow the magnet 32 to come as close as possible to the center axis of the core where the magnetic interaction between the cores and the magnet is greatest. However, it is to be noted that magnet 32 does not directly engage the cores. Instead on opposite sides at each end of the magnet there is provided a rounded protuberance 44 formed of non-magnetic material. These protuberances act as bumpers; they are positioned to engage the flat core surfaces 42 and thereby assure that in each of the two magnet positions a slight gap exists between the magnet and the cores which limit its movement. This slight gap is necessary for proper operation of the unit.

Also forming part of the electromagnet assembly are two insulating discs 46 and 48 disposed on opposite sides of the soft iron disc 22, and a printed circuit board 50. It is to be noted that the two insulating discs 46 and 48 and the soft iron disc 22 are formed with central openings so as to accommodate a second shaft bearing member 52 which is identical in shape to bearing member 16. The upper insulating disc 46 is provided with suitable apertures to accommodate the metal cores; additionally it is provided with four holes 56 to bring out the leads of the coils. Corresponding lead holes are provided in the lower insulating disc 48 and the printed circuit board 50. The latter is formed with a plurality of conductive lands 58 on its bottom side which serve as connecting points for the leads from the coils and also for four terminal leads 62, 64, 66 and 68. The printed circuit board is not shown in detail since its form is not critical to the invention. In the connection it is to be noted that the coil 26A is connected in series with coil 26C and coil 26B is connected in series with coil 26D. The terminal leads 62 and 64 are connected to coils 26A and 26C while leads 66 and 68 are connected to coils 26B and 26D. The operative drive circuit is shown schematically in FIG. 5 where a suitable power source 70 is connected to the two pairs of series-connected coils by a pair of switches 72 and 74 that are coupled so that one closes when the other is opened. The power source, switches and coils are connected so as to apply power to the coils with a polarity that causes operation by magnetic repulsion rather than magnetic attraction.

The specific mode of operation is as follows: Let it be assumed that all of the coils are deenergized and that the magnet 32 is in the position illustrated in FIG. 3 wherein its north pole end is resting against core 20A and its south pole end is next to core 20C. Let it be assumed further that in this position the rotatable indicator disc 34 is positioned with its dark sectors 38 behind the white opaque sectors of the window pane 8, so that the viewer sees an all-white indication. If now coils 26A and 26C are energized so that the upper ends of their cores 20A and 20C assume north and south magnetic polarities respectively, the magnet 32 will be repelled toward the cores 20B and 20D. Magnet 32 and shaft 28 will rotate rapidly under the repelling force of the electromagnets 26A and 26C. The repelling force will drive the magnet against cores 20B and 20D and it will stay in this position even after coils 20A and 20C are deenergized. In this new position the black sectors 38 will be aligned with the transparent sectors 12 of pane 8 to give a black and white indication. The magnetic circuit for magnet 32 presented by cores 20B, 20D and disc 22 yields a detent action whereby the magnet will hold its new position under shock and vibration until coils 26B and 26D are energized in a manner to impart north and south magnetic polarities to cores 20B and 20D respectively, whereupon the magnet will be repelled back to its original position.

Of course, it is to be understood that the device just described may be energized so as to achieve operation by magnetic attraction instead of repulsion. Thus, with magnet 32 initially in the position shown in FIG. 3, movement of the magnet could be achieved by energizing coils 26B and 26D so as to make the upper ends of cores 20B and 20D south and north poles respectively. However, operation by magnetic attraction is far less satisfactory than operation by magnet repulsion and far greater power is required in order to move magnet 32. A third alternative is to use both repulsion and attraction simultaneously. However, this is not recommended since it requires energizing all four coils simultaneously. It is also deemed obvious to wire the coils in parallel rather than in series, or to use two instead of four coils. In this connection it is to be appreciated that in the illustrated device coils 26A and 26C are in effect one coil since they are connected in series; the same is true of coils 26B and 26D.

FIGS. 6 and 7 disclose a modification of the invention which has the same basic construction as the preferred embodiment but differs therefrom in several respects. For ease of description, like numbers are used to designate components identical to those already described in connection with FIGS. 1–4. Essentially the device of FIGS. 6 and 7 comprises a case 80 with an exterior thread 82 at its bottom end for securing it to a display panel. The case also has a peripheral flange 84 intermediate its ends. Surrounding the case and engaging flange 84 is a cylindrical ring 86. The latter is sized to rotate relative to the case. It is held in place by two set screws 88 and 90. The inner end of set screw 88 rides in a groove 92 formed in the side of the case. Set screw 90 protrudes through a slot 94 cut in the case. Groove 92 and slot 94 are diametrically opposed and each extends approximately ¼ of the way around the case. The ring 86 includes an annular groove 96 cut in its bottom face. Disposed in groove 96 is a coiled return spring 98. One end of the spring is anchored in flange 84 as shown at 100 and the other end is anchored in ring 86 as shown at 102. With reference to FIG. 7, the spring urges ring 86 counterclockwise so that normally screws 88 and 90 are in the positions shown in the drawing.

The elements mounted within case 82 are the same as in the device of FIGS. 1–4, except that coils 26A and 26C are not used and their terminal leads 62 and 64 are omitted. Coils 26A and 26C are illustrated only to emphasize that the same electromagnetic assembly may be used in both embodiments. The operative series-connected coils 26B and 26D are coupled via the terminal leads 66 and 68 to a power source (not shown) like power source 70 by a switching means (also not shown) corresponding to switch 74. The power-to-coil connections are such that when coils 26B and 26D are energized the upper ends of cores 20B and 20D asume north and south magnetic polarities respectively. When this occurs the magnet 32 is magnetically repelled away from cores 20B and 20D toward cores 20A and 20C. The magnet will be stopped by cores 20A and 20C and will become magnetically latched thereto. The rotation of magnet 32 is evidenced by a new indication displayed in the window. This new indication will remain after the coils have been deenerized. Restoration of the original indication is accomplished by rotation of ring 86. In this connection it is to be noted that the magnet 32 extends radially beyond the cores a distance sufficient to be engaged by set screw 90 when the ring is rotated. In its normal position set screw 90 is located between cores 20A and 20D but just short of core 20A; hence the north pole of the magnet can come to rest against core 20A without interference from screw 90. However, on clockwise rotation of the ring screw 90 will engage the magnet and push it back to its original position against cores 20B and 20D. The magnet will automatically relatch itself magnetically to cores 20B and 20D and hold this new position even after the spring has restored the ring to its initial at rest position.

It is to be noted that the case 80 has its screw thread 82 on its bottom end instead of its top or front end as with case 2. This location of screw thread 82 allows case 80 to be front mounted on the display panel and thereby makes ring 86 accessible for manual operation.

The invention as described and illustrated has many advantages. For one thing, operation by magnetic repulsion is faster and requires less power input than operation by magnetic attraction. These characteristics, together with the relatively great sensitivity (in comparison with attraction-type devices) resulting from the small air gap between the rotatably magnet and the core associated with the coil producing the repelling field, permit reliable pulse-type operation. Also contributing to reliability of operation is the simplicity of construction of the invention. It lends itself to pre-assembly of parts into discrete sub-assemblies, thereby facilitating manufacturing and inspection. Installation is quick and the low power facilitates its use in miniature portable equipment. Of particular importance is the fact that the shutter type visual indication is easily distinguishable under greater varying light conditions and is not affected by shock and vibration.

It is to be understood that the invention is not limited in its application to the details of construction and arrangement of parts specifically described or illustrated, and that within the scope of the appended claims, it may be practiced otherwise than as specifically described or illustrated.

I claim:

1. A bistable electromagnetic indicator comprising; a rotatable shaft, four electromagnets including two separate coil pairs, a magnetic core disposed within each coil, said cores in substantial parallel relation to each other, a magnet connected for rotation with said shaft, on a single axis extending parallel to said cores, and said magnet being polarized diametrically relative to the axis of rotation of said shaft, said coils adapted to be energized so as to induce magnetic polarities in said cores with sufficient field strength to cause rotation of said magnet between a first and second position, said magnet projecting laterally of said axis a distance sufficient to provide a minmum reluctance path between the ends of said magnet and its associated magnetic cores when said magnet is in either position, and indicator means for providing a first indication when said magnet is in said first position and a second indication when said magnet is in said second position.

2. An electromagnetic indicator as defined by claim 1, further including first and second spaced stop members located in the path of rotational movement of said magnet, said stop members spaced so as to determine first and second limit positions for said magnet, and wherein said magnet is provided with resilient non-magnetic means for maintaining a gap between said magnet and said first and second stop members when said magnet is in either position.

3. An indicator as defined by claim 1 wherein said cores are coupled together by a magnetic disc.

4. An electromagnetic indicator as defined in claim 1 wherein said magnet has salient poles located at said opposite ends so that the field of said magnet coacts with said cores to magnetically latch said magnet in each of said first and second positions when said electromagnetic means are de-energized.

5. An electromagnetic indicator as defined by claim 4 further including means for energizing each of said electromagnetic means so that the magnetic field produced thereby initiates rotation of said magnet in a given direction by repulsion and completes rotation of said magnet in said given direction by attraction.

6. An electromagnetic indicator comprising a case, a shaft rotatably mounted within said case, a permanent magnet attached to said shaft so as to rotate therewith, said magnet projecting radially of said shaft, first and second spaced stop members located in the path of rotational movement of said magnet, said stop members spaced so as to determine first and second limit positions for said magnet, energizable electromagnetic means located within said case, said electromagnetic means located so that when energized it provides a magnetic field that influences said magnet to rotate from said first limit position to said second limit position, means mounted for rotation with said magnet operative to provide a first indication when said magnet is in said first position and a second indication when said magnet is in said second position and means rotatably attached to said case for manually rotating said magnet from said second to said first positoin comprising a ring rotatably attached to said case and a member carried by said ring disposed so as to engage said magnet and move it from said second to said first positon when said ring is rotated in a predetermined direction relative to said case.

7. An electromagnetic indicator as defined by claim 6 wherein said member comprises a pin, and further wherein said case is provided with a slot through which said pin projects, said slot extending circumferentially of said case for a distance sufficient for said pin to move said magnet from said second to said first position when said ring is rotated in said predetermind direction.

8. An indicator as defined by claim 6 further including a spring biasing said ring against movement in said predetermined direction.

References Cited

UNITED STATES PATENTS

| | | | |
|---|---|---|---|
| 2,452,034 | 10/1948 | Campbell | 340—373 |
| 2,740,956 | 4/1956 | Hatton | 340—373 |
| 3,026,512 | 3/1962 | Baker | 340—373 |
| 3,140,431 | 7/1964 | Schalkwijk | 340—373 X |
| 2,245,493 | 6/1941 | Nothe | 340—373 |
| 3,074,060 | 1/1963 | Kadlec | 340—381 X |
| 3,210,758 | 10/1965 | Huston | 340—373 |

JOHN W. CALDWELL, *Primary Examiner.*

H. I. PITTS, *Assistant Examiner.*